US005781977A

United States Patent [19]

Servones

[11] Patent Number: 5,781,977

[45] Date of Patent: Jul. 21, 1998

[54] BALL JOINT COMPRESSOR

[75] Inventor: Daniel Servones, Mount Vernon, N.Y.

[73] Assignee: Lawrence I. Wechsler, Great Neck, N.Y.; a part interest

[21] Appl. No.: 388,199

[22] Filed: Feb. 13, 1995

[51] Int. Cl.[6] ........ B23P 19/04

[52] U.S. Cl. ........ 29/259

[58] Field of Search ........ 254/10.5; 29/259, 29/263, 282, 257

[56] References Cited

U.S. PATENT DOCUMENTS

| | | | |
|---|---|---|---|
| 1,469,076 | 9/1923 | Faber | 29/259 |
| 2,566,460 | 9/1951 | Mihalic | 29/227 |
| 3,142,897 | 8/1964 | Davis | 29/259 |
| 3,902,698 | 9/1975 | Furrer et al. | 254/10.5 |
| 4,395,020 | 7/1983 | Spainhour | 254/10.5 |
| 4,502,197 | 3/1985 | Harder | 29/259 |

*Primary Examiner*—Robert C. Watson

*Attorney, Agent, or Firm*—Lawrence I. Wechsler; Wechsler & Wechsler, P.C.

[57] ABSTRACT

An tool for installation of a ball joint into an interference-fit accommodating hole in a control arm of a vehicle is provided, which operates as an integrated unit. A body of the ball joint compressor includes an upper and a lower support, spaced apart and fixedly interconnected by a pair of bilateral supports. A movable compression member is mounted to the body of the ball joint compressor, to allow movement thereof between the upper and lower supports along a central vertical axis. An advancing screw is threaded through the lower support, providing a means by which movement may be imparted to the movable compression member. The upper support includes an upper stop extending downwardly and including a cavity for receiving a portion of a ball joint which protrudes through an accommodating hole in a control arm during compression. This configuration allows the upper stop to contact the control arm from above, adjacent to the accommodating hole for the ball joint. The movable compression member includes a compression surface for contacting the ball joint from below. The screw is advanced by pneumatic or other suitable means, imparting upward movement to the movable compression member, in turn compressing the ball joint from below into the accommodating hole, the upper stop preventing movement of the control arm in the direction of advancement.

26 Claims, 3 Drawing Sheets

BALL JOINT COMPRESSOR

BACKGROUND OF THE INVENTION

The present invention relates to a tool for installing a ball joint in a vehicle and more particularly, a hand-held tool for simplifying the installation of a ball joint in a control arm which requires a press-fit union, such as a lower control arm.

Ball joints are commonly used in vehicles including cars, trucks, ambulances and the like, to provide means for transferring axial forces while permitting freedom of movement along three axes. These joints generally include a socket formed within an external casing, and a movable ball having a stem extending therefrom receivable within the socket. The lower ball joint is secured to the lower control arm by an interference-fit union between the ball joint casing and an accommodating hole in the lower control arm. The casing has an enlarged portion, or shoulder, at a lower end thereof to allow the ball joint to seat against the lower control arm when pressed in from below a measured distance into the hole.

Replacement of worn ball joints requires removal of the defective ball joint from the lower control arm, and installation of a replacement ball joint by forcing the ball joint casing into press-fit engagement with the interior of the accommodating hole in the lower control arm to achieve proper seating of the ball joint against the control arm.

Removal of the defective ball joint is relatively straight forward. The vehicle is raised, and a jack stand is placed below the lower control arm in a position behind the ball joint. The car is then lowered until the lower control arm rests on the jack stand. The ball joint is then removed from the hole in the lower control arm by striking the ball joint from above with a hammer. Once removed, several procedures have been followed in the prior art to install the replacement ball joint.

In one such procedure, the vehicle is raised off the jack stand, and the jack stand relocated below the hole in the lower control arm for accommodating the replacement ball joint. The ball joint is placed atop the jack stand, below the accommodating hole in the lower control arm. The vehicle is then lowered to apply weight from the lower control arm to the top of the ball joint casing. The lower control arm is struck repeatedly from above with a hammer in the region adjacent the ball joint, which combined with the weight of the vehicle, presses the ball joint casing into the accommodating hole in the lower control arm. Often this procedure did not properly seat the ball joint in the accommodating hole. Further, as a result of the repeated hammer strikes, the bearing in the ball joint was often damaged. In addition, the accommodating hole in the lower control arm sometimes enlarged or put in an out of round condition, resulting in a loose fit between the ball joint casing and the accommodating hole. Welding would then be required to prevent having to replace the lower control arm.

To avoid the above drawbacks, alternatively, the entire lower control arm was removed from the vehicle in the prior art. The ball joint could then be pressed into the hole in the control arm using a standard table vise. This procedure, however, required several hours of labor to disassemble the springs, shaft, stabilizers, etc.

A tool for simplifying installation of a ball joint by compression into the hole in the lower control arm is described in the prior art, a cross-section view of which appears in FIG. 1. The prior art ball joint compressor comprises a generally C-shaped clamp and a threaded shaft in threaded engagement with a lower part thereof. The threaded shaft includes a lug which permits coupling to an output of a pneumatic driver to advance or withdraw the threaded shaft. The prior art ball joint compressor required use of a set of upper and lower adapters, and a compression sleeve, each comprising a unit separate from the C-shaped clamp and the threaded shaft.

During use, the lower adapter was balanced atop the threaded shaft, and the ball joint to be installed placed atop the lower adapter. The ball joint was then inserted from below through the press-fit hole in the lower control arm. Compression sleeve was placed around the protruding ball joint from above the lower control arm, the lower edge of the compression sleeve contacting the upper surface of the lower control arm adjacent to the periphery of the hole therein. The upper adapter was then placed atop the compression sleeve, while maintaining the positioning of all balanced components. The threaded shaft was then advanced, by hand, an amount sufficient to bring the top of the upper adapter into contact with the top of the C-shaped clamp, with all stacked components in alignment with a common vertical axis. The pneumatic driver was then used to advance the threaded shaft, which in turn pressed the ball joint into the hole in the lower control arm until the ball joint was completely seated.

Although the prior art ball joint compressor pressed a ball joint into the accommodating hole without the use of a hammer, thereby avoiding the associated traumatic effects, the tool was cumbersome to operate, requiring the balancing of a series of relatively heavy, disconnected elements. Further, to assist in the balancing thereof, it was necessary to use a set of adapters, each sized to fit a particular model ball joint.

OBJECTS AND SUMMARY OF THE INVENTION

Accordingly, it is an object of the invention to provide an automotive repair tool for installation of a ball joint into an interference-fit accommodating hole in a control arm which overcomes the drawbacks of the prior art.

It is a further object of the invention to provide the tool for compression of a ball joint into an interference-fit accommodating hole of a control arm which operates in a reliable manner, and which rapidly and properly seats the ball joint in the accommodating hole.

It is a still further object of the invention to provide the tool for performing ball joint compression which is compact, self-contained and easy to use, and which may be produced economically.

Briefly stated, there is provided an automotive repair tool for installation of a ball joint into an interference-fit accommodating hole in a control arm, otherwise referred to as a ball joint compressor, which operates as an integrated unit, and finds particular application for replacing ball joints in a lower control arm. A body of the ball joint compressor includes an upper and a lower support, spaced apart and fixedly interconnected by a pair of bilateral supports connected to opposing ends of each, and extending therebetween. A movable compression member is mounted to the body of the ball joint compressor, to allow movement thereof between the upper and lower supports along a central vertical axis. In a preferred embodiment, the movable compression member rides along the bilateral supports which extend through suitably shaped holes in the movable compression member for slidably receiving same. An advancing screw is threaded through the lower support, disposed along the central vertical axis, providing a means by which movement may be imparted to the moveable compression member. The upper support includes an upper stop having structure extending downwardly and including a cavity for receiving an upper part of a ball joint therein, which protrudes through an accommodating hole in a control arm during compression. This configuration allows a lowermost surface on the upper stop, which surface faces the movable member, to contact the control arm from above, adjacent to the accommodating hole for the ball joint. The movable compression member includes a compression surface for contacting a base of the ball joint to be installed into the accommodating hole from below.

Installation of the ball joint is accomplished by first loosely inserting the ball joint into the accommodating hole from an insertion side of a control arm. In the case of a lower control arm, for which this invention will find particular application at present, the insertion side is the lower side, the ball joint being inserted from below during installation. The ball joint compressor is moved into place, with the end of the control arm in which the ball joint is located extending through the space in the tool bounded by the bilateral supports on either side, the upper support above and the movable compression member below. In this position, the base of the ball joint rests on the lower compression surface, and the lowermost surface on the upper stop is aligned with the surface of the control arm adjacent the accommodating hole. The bilateral symmetry of the ball joint compressor permits the entire tool to be balanced from above when the upper stop is allowed to rest on the control arm contact surface adjacent the accommodating hole, thereby facilitating the repair procedure. The screw is advanced by pneumatic or other suitable means, imparting upward movement to the movable compression member, in turn compressing the ball joint from below into the accommodating hole, the upper stop preventing movement of the control arm in the direction of advancement.

The above, and other objects, features and advantages of the present invention will become apparent from the following description read in conjunction with the accompanying drawings, in which like reference numerals designate the same elements.

DETAILED DESCRIPTION OF THE PREFERRED EMBODIMENT

Figure 1:
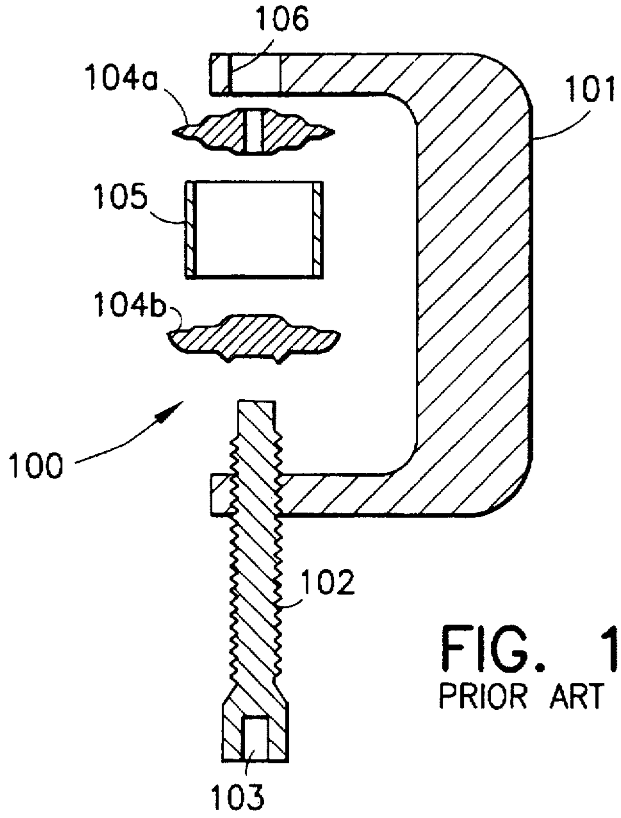
FIG. 1 PRIOR ART
FIG. 1 is a side elevation of a prior art ball joint compressor.

Before turning attention to the present invention, a prior device for compressing ball joints is described with reference FIG. 1, in which a prior art ball joint compressor is generally designated 100. Prior art ball joint compressor 100 includes a generally C-shaped clamp 101 and a threaded shaft 102 in threaded engagement with C-shaped clamp 101 at a lower part thereof. A lug 103 permits coupling to an output of a pneumatic driver to advance or withdraw threaded shaft 102. Prior art ball joint compressor 100 also includes a set of upper and lower adapters 104*a* and *b*, and a compression sleeve 105, shown in their relative arrangement during use, but each comprising individual units separate from C-shaped clamp 101 and threaded shaft 102.

Lower adapter 102*b* is balanced atop threaded shaft 102. The ball joint to be installed is placed atop lower adapter 102*b*, and inserted from below through the press-fit hole in the lower control arm. Compression sleeve 105 is placed around the protruding ball joint from above the lower control arm, the lower edge of compression sleeve 105 contacting the upper surface of the lower control arm adjacent to the periphery of the hole therein. Upper adapter 104*a* is placed atop compression sleeve 105, and threaded shaft 102 is advanced an amount sufficient to bring the top of upper adapter into contact with the top of C-shaped clamp 101, with a vertical axis of all stacked components in alignment with a hole 106. The pneumatic driver is then used to advance threaded shaft 102, which in turn presses the ball joint into the hole in the lower control arm until the ball joint is completely seated. Hole 106 accommodates the ball joint stem during compression. Threaded shaft 102 is then withdrawn, allowing prior art ball joint compressor 100 to be removed.

Prior art ball joint compressor 100 suffers from a variety of drawbacks, making the operation thereof cumbersome. For example, the asymmetric vertical shape of C-shaped clamp 101 added to the already difficult task of balancing a series of relatively heavy, disconnected elements atop threaded shaft 102. Further, to assist in the balancing thereof, it was necessary to use a set of adapters, each sized to fit a particular model ball joint.

Figure 2:
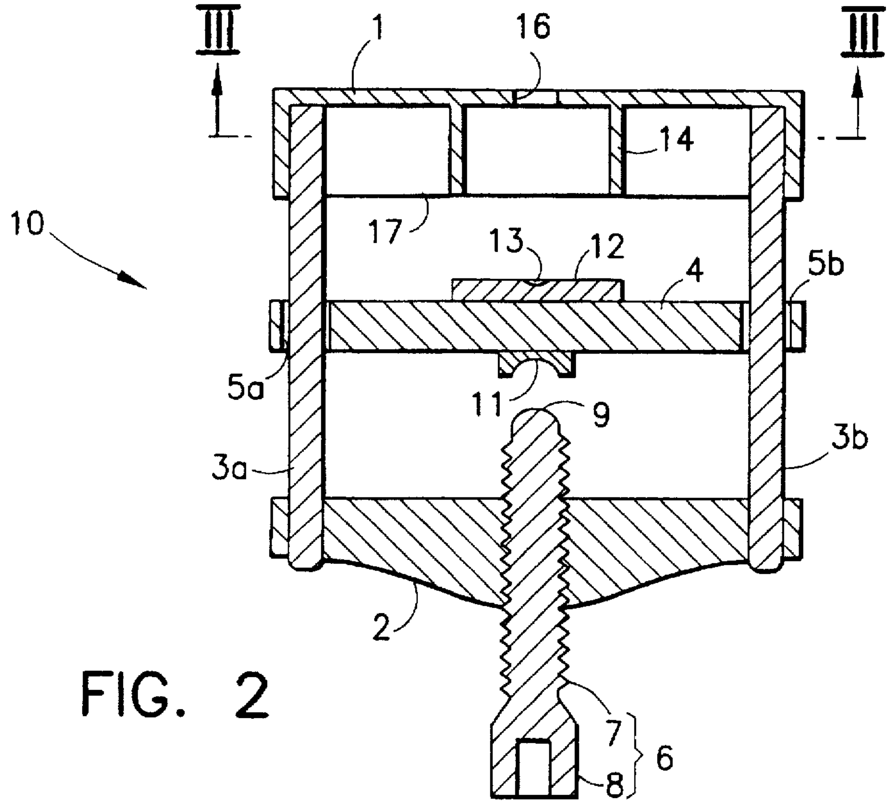
FIG. 2 is a cross-sectional view of a ball joint compressor of an embodiment in accordance with the invention.
Figure 3:
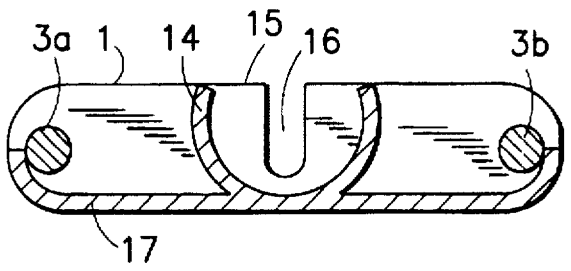
FIG. 3 is a cross-sectional view of the ball joint compressor taken along line III—III of FIG. 2.
Figure 4:
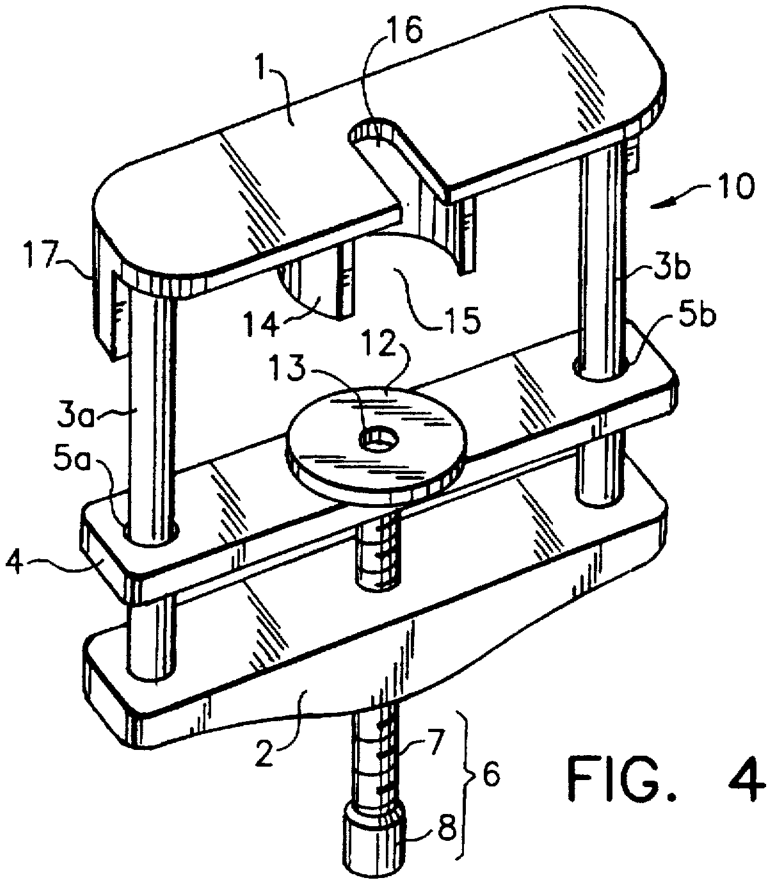
FIG. 4 is a perspective view of the ball joint compressor of FIGS. 2 and 3.

Referring now to FIGS. 2–4, there is shown, generally at 10, a ball joint compressor, in accordance with the invention. When used for the replacement of lower ball joints, to which this invention is particularly suited at present, ball joint compressor 10 is oriented in an upright position as illustrated in the figures, the terminology defining the relationship of elements described as follows reflecting this orientation. However, it will be understood that other applications may be found for ball joint compressor 10, in which the operation thereof will be other than upright as shown and described, without departure from the intended scope of the invention.

Ball joint compressor 10 includes an upper support 1 fixedly connected to a lower support 2 by a pair of bilateral supports 3*a* and 3*b*. Bilateral supports 3*a* and 3*b* are generally parallel, permitting a compression member 4 to freely slide between upper support 1 and lower support 2, along bilateral supports 3*a* and 3*b* slidingly and captively received within lateral holes 5*a* and 5*b* formed through compression member 4. An advancing screw 6 includes a threaded portion 7 in threaded engagement with lower support 2, a lug portion 8 at one end thereof, and a rounded pivot 9 at an opposite end. Compression member 4 includes a pivot seat 11 on a lower side thereof, for receiving rounded pivot 9, allowing pivotal transfer of force to compression member 4 exerted by advancing screw 6 when advanced, which will be explained in greater detail below. Compression member 4 further includes a compression surface 12 which protrudes above the surrounding upper surface of compression member 4. Because ball joints include a grease fitting at their lower end, a central hole 13 in compression surface 12 is provided for receiving the grease fitting during compression to prevent damage thereto, and to allow compression surface 12 to evenly contact the base of the ball joint.

Upper support 1 includes a tube-shaped control arm stop 14 having a stop opening 15 which runs the vertical length thereof. In the preferred case as illustrated, control arm stop 14 is generally cylindrical in shape, but may alternatively be any suitable tube shape, for example a tube of square cross-section. A stem slot 16 is cut in upper support 1, having an opening in alignment with stop opening 15, and both being positioned perpendicular to the plane common to bilateral supports 3a and 3b. Stop opening 15 and stem slot 16 permits ball joint compressor 10 to be more readily slidingly fitted into place during a ball joint installation by respectively accommodating the body and stem of the ball joint, and minimizes the required overall height of ball joint compressor 10, as will be described in greater detail below. An upper support skirt 17 provides extra support against possible upward bowing of upper support 1 when compression force is applied by the advancement of advancing screw 6.

Figure 5A:
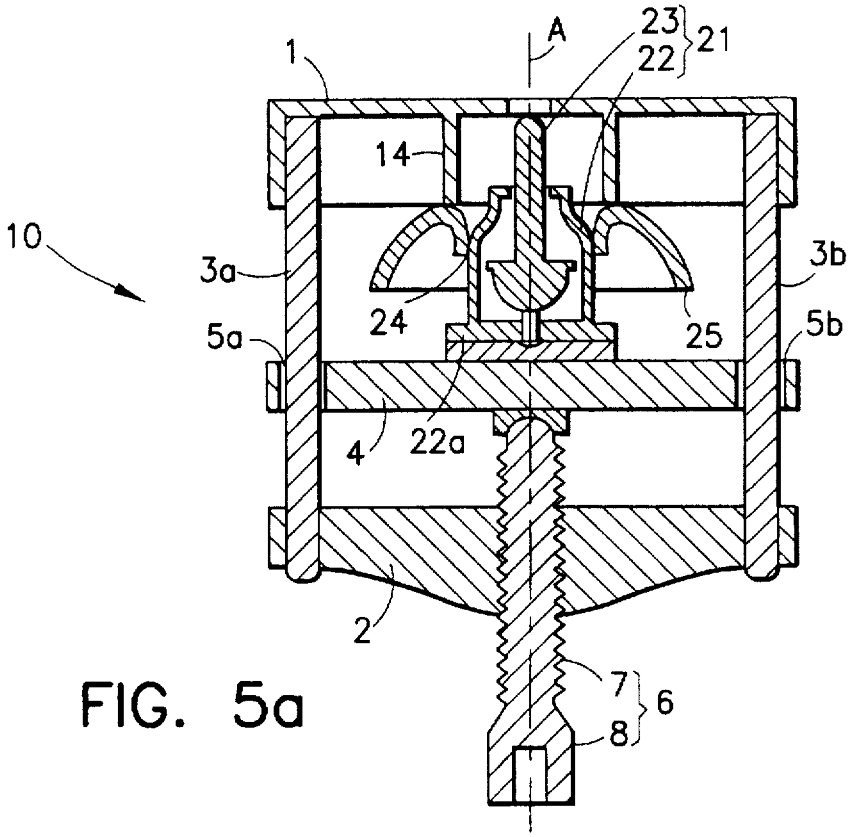
FIG. 5*a* is a cross-sectional operational view of the ball joint compressor of FIGS. 2–4, prior to compression of a ball joint into a lower control arm.
Figure 5B:
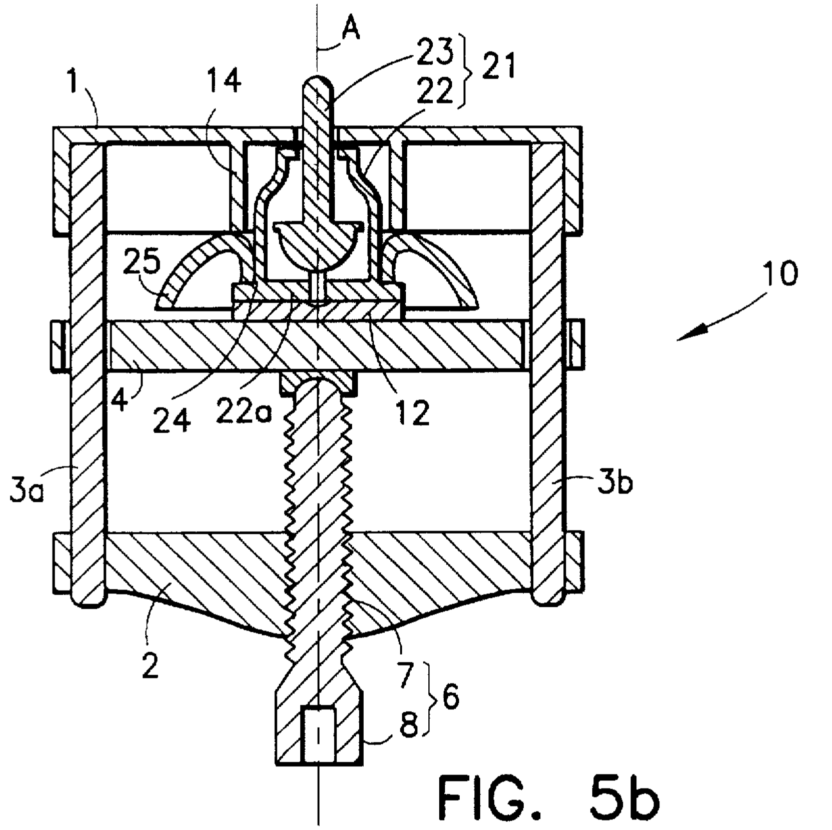
FIG. 5*b* is a cross-sectional operational view of the ball joint compressor of FIG. 5*a* showing the ball joint in seated position following compression thereof into the lower control arm.

Operation of ball joint compressor 10 in performing a ball joint installation in a lower control arm, will now be described with reference to FIGS. 5a and 5b, illustrating in cross-section a ball joint 21 prior to and after compression, respectively. Referring first to FIG. 5a, a ball joint 21, comprising a casing 22 including a casing shoulder 22a, and a stem 23 protruding therefrom, is lightly tapped from below into press-fit engagement with an accommodating hole 24 in a lower control arm 25. In this position, ball joint 21 protrudes from above lower control arm 25. Ball joint compressor 10 is placed in proper position for compression, with control arm 25 received between upper support 1 and compression member 4, and the protruding portion of ball joint 25 received within control arm stop 14. Stop opening 15 minimizes the required overall height of ball joint compressor 10 by allowing proper positioning thereof merely by horizontal motion of ball joint compressor 10 in a direction in which stop opening 15 faces balljoint 21. Omission of stop opening 15 would require the lowering of control arm stop 14 over the portion of ball joint 21 protruding from above lower control arm 25, necessitating greater clearance space between upper support 1 and compression member 4, thereby increasing the overall height and weight of ball joint compressor 10.

In the preferred case, advancement screw 6, compression surface 12, and control arm stop 14 are disposed along a common vertical axis A, and centrally located between bilateral supports 3a and 3b. This arrangement provides a great degree of stability when performing lower ball joint compression, in which ball joint compressor 10 is oriented vertically. More particularly, because of the bilateral symmetry, ball joint compressor 10 is readily balanced from above by contact of control arm stop 14 with the top surface of lower control arm 25, making it easy to handle. So balanced, advancement screw 6 may then be hand tightened until it pushes compression member 4 vertically along bilateral supports 3a and 3b, and into contact with the lower surface of casing 23 of ball joint 21, as shown in FIG. 5a.

Turning now to FIG. 5b, a pneumatic driver (not shown), or other means for applying rotational torque to advancement screw 6 is connected to lug portion 8. Advancement screw 6 is advanced by the applied rotational force, the linear vertical displacement being transferred to compression member 4 through pivotal cooperation between rounded pivot 9 within pivot seat 11. Control arm stop 14, in contact with an upper surface of lower control arm 25 adjacent accommodating hole 24, prevents displacement of upper support 1 with respect to lower control arm 25, allowing ball joint 21 to be pressed into accommodating hole 24 by action of compression member 4 against casing 22 of ball joint 21. Lateral holes 5a and 5b in compression member 4 within which bilateral supports 3a and 3b are captively received, are oversized, to provide a "sloppy" fit between lateral holes 5a and 5b and bilateral supports 3a and 3b, which permits the tilting of compression member 4 off an axis parallel with a contact surface of control arm stop 14. This arrangement, in combination with the pivotal transfer of vertical displacement of advancement screw 6 to compression member 4, distributes displacement force to casing 23 as necessary to insure the proper seating of ball joint 21 within accommodating hole 24 wherein casing shoulder 22a is shouldered against lower control arm 25 in full peripheral contact therewith, as shown in FIG. 5b.

When fully compressed, casing 22 of ball joint 21 is received within control arm stop 14. Stem slot 16 is disposed along common vertical axis A to allow stem 23 to protrude therethrough after compression, minimizing the overall height requirement of control arm stop 14, and hence that of ball joint compressor 10. A slot is used for purposes of accommodating stem 23 rather that a hole, to facilitate horizontal removal of ball joint compressor 10 from lower control arm 25 following compression. To remove ball joint compressor 10 from lower control arm 25, advancement screw 6 is withdrawn, and ball joint compressor 10 moved horizontally, stop opening 15 and stem slot 16 providing respective clearance for casing 22 and stem 23 of ball joint 21. As previously noted, compression surface 12 is centrally located and raised above the upper surface of compression member 4. This feature permits full compression of ball joint 21 into accommodating hole 24 even in the case where the lowermost edge of lower control arm 25 extends beyond the base of ball joint casing 22 when ball joint 21 is fully seated, as shown, for example, in FIG. 5b.

In the preferred embodiment, as described herein, compression member 4 is movably mounted to the body of ball joint compressor 10 by lateral holes 5a and 5b which slidingly and captively receive parallel bilateral supports 3a and 3b therethrough. However, is noted that any means for mounting that allows vertical movement may be employed without departure from the intended scope of the invention. For example, a suitably shaped compression member may be directly mounted to advancement screw 6 through an appropriate coupling means. In this case, bilateral supports 3a and 3b need not be parallel, since they no longer function in part as guide rails, but rather merely provide lateral support for ball joint compressor 10. Further, a raised central compression surface would no longer be required since the size of the alternative compression member could be made small enough to fit between the lower edges of the lower control arm, allowing the ball joint to be fully compressed in all cases. It is additionally noted that although advancement screw 6 provides means for advancing compression member 4 towards upper support 1 and applying pressure to a ball joint during installation in the preferred case, any suitable means for advancement may be alternatively used. For example, a ratchet mechanism permitting stepwise advancement, similar to that of a car jack, may be appropriately designed.

Having described preferred embodiments of the invention with reference to the accompanying drawings, it is to be understood that the invention is not limited to those precise embodiments, and that various changes and modifications may be effected therein by one skilled in the art without departing from the scope or spirit of the invention as defined in the appended claims.

What is claimed is:

1. A tool for use during installation of a ball joint into an interference-fit accommodating hole in a control arm, in which installation the ball joint having a base and a stem is inserted, stem first, into the accommodating hole from an insertion side of said control arm to protrude from an exiting side thereof, and advanced therein by a compression force until seated, said repair tool comprising:

a body including upper support means and lower support means spaced apart and fixedly interconnected by a pair of bilateral support means, said ball joint and said control arm being received therebetween during the installation, said upper support means including an upper support member;

compression means for contacting the base of said ball joint, mounted to said body and movable along an axis of travel substantially perpendicular to said upper support means and said lower support means, and disposed therebetween;

control arm stop means carried on said upper support means for contacting the control arm adjacent said accommodating hole, said control arm stop means including a tube-shaped member longitudinally extending from a surface of said upper support member in a direction towards said compression means; and means for advancing said compression means towards said upper support means whereby compression force may be exerted upon the ball joint by said compression means, said control arm stop means preventing motion of the control arm in the direction of a resultant ball joint advancement, whereby the ball joint is compressed into seated position.

2. The tool according to claim 1, wherein:

said bilateral support means are substantially parallel with one another; and said compression means includes a compression member, said compression member including means for slidably receiving said bilateral support means therethrough at opposed sides thereof.

3. The tool according to claim 1, wherein:

said tube-shaped member is cylindrical, and includes a side opening which runs substantially a longitudinal length thereof.

4. The tool according to claim 3, wherein:

said upper support member includes a stem slot formed therethrough in communicative alignment with said side opening.

5. The tool according to claim 1, wherein:

said lower support means includes a lower support member; and said means for advancing said compression means includes a screw threadingly received through said lower support member.

6. The tool according to claim 5, wherein:

said advancement screw includes pneumatic coupling means carried on an outwardly facing end thereof.

7. The tool according to claim 5, further including:

means for pivotably transferring a compression force to said compression member carried on confronting surfaces of said screw and said compression member.

8. The tool according to claim 7, wherein:

said means for pivotaly transfering a compression force includes a rounded pivot end carried on said screw and a pivot seat carried on said compression member for receiving said rounded pivot end in butted engagement therewith as said screw is advanced.

9. The tool according to claim 1, wherein:

said compression member includes a centrally located raised compression surface.

10. A tool for use during installation of a ball joint into an interference-fit accommodating hole in a control arm, in which installation the ball joint having a base and a stem is inserted, stem first, into the accommodating hole from an insertion side of said control arm to protrude from an exiting side thereof, and advanced therein by a compression force until seated, said repair tool comprising:

a body including upper support means and lower support means spaced apart and fixedly interconnected by a pair of bilateral support means which are substantially parallel with one another, said ball joint and said control arm being received therebetween during the installation;

control arm stop means carried on said upper support means for contacting the control arm adjacent said accommodating hole;

compression means for contacting the base of said ball joint, mounted to said body and movable along an axis of travel substantially perpendicular to said upper support means and said lower support means, and disposed therebetween;

said compression means including a compression member, said compression member including means for slidably recieving said bilateral support means therethrough at opposed sides thereof;

said compression member includes a centrally located raised compression surface, said compression surface including a central hole for receiving a grease fitting of said ball joint during compression thereof; and means for advancing said compression means towards said upper support means whereby compression force may be exerted upon the ball joint by said compression means, said control arm stop means preventing motion of the control arm in the direction of a resultant ball joint advancement, whereby the ball joint is compressed into seated position.

11. The tool according to claim 1, wherein:

said control arm stop means, said compression means and said means for advancing are disposed along a common axis, said axis being located substantially equidistant between said bilateral support means.

12. The tool according to claim 1, wherein:

said upper support member further includes a skirt disposed at least partially about a periphery thereof.

13. A tool for compressing a ball joint into seated engagement within an interference-fit accommodating hole in a control arm, the tool comprising;

a body including spaced upper and lower support parts and a pair of bilateral support parts, said pair of bilateral support parts interconnecting common ends of said upper and lower support parts so as to present an encircling body structure;

said upper support part including stop means for contacting the control arm adjacent said accommodating hole and for spacing the control arm apart from a remainder of said upper support part;

a movable compression member disposed between said upper and said lower support parts, the control arm and the ball joint being receivable between said upper support part and said compression member during an installation, said compression member including means for contacting a base of the ball joint; and means for advancing said compression member in a direction towards said upper support part whereby compression force may be exerted upon the ball joint by said compression member, said stop means preventing motion of the control arm in the direction of a resultant ball joint advancement, whereby the ball joint is compressed into seated position.

14. The tool according to claim 13, wherein:

said bilateral support parts are substantially parallel with one another; and said compression member is slidably mounted at each of opposite lateral ends thereof to a corresponding one of said bilateral support parts.

15. The tool according to claim 13, wherein:

at least a portion of said stop means is tube-shaped, having a longitudinal axis extending in a direction towards said compression member.

16. The tool according to claim 15, wherein:

said tube-shaped portion is cylindrical, and includes structure defining a longitudinally disposed opening therein.

17. The tool according to claim 16, wherein:

said longitudinally disposed opening extends continuously from a terminal end of said tube-shaped portion to said upper support part; and said upper support part includes a stem slot formed therethrough in communicative alignment with said longitudinally disposed opening.

18. The tool according to claim 13, wherein:

said upper support part further includes a skirt disposed at least partially about a periphery thereof.

19. The tool according to claim 13, wherein:

said means for advancing said compression member includes a screw threadingly received through said lower support.

20. The tool according to claim 19, further including:

means for pivotably transfering a compression force to said compression member carried on confronting surfaces of said screw and said compression member; and said means for pivotaly transfering a compression force includes a rounded pivot end carried on said screw and a pivot seat carried on said compression member for receiving said rounded pivot end in engagement therewith as said screw is advanced.

21. The tool according to claim 13, wherein:

said means for contacting a base of the ball joint includes a compression surface; and said compression surface includes a central hole formed therein for receiving a grease fitting of said ball joint during compression thereof.

22. The tool according to claim 13, wherein:

said bilateral support parts and said stop means being disposed substantially symmetrically about a common tool axis; and said compression member and said means for advancing being movable substantially along said common tool axis.

23. A tool for compressing a ball joint into seated engagement within an interference-fit accommodating hole in a control arm, the tool comprising;

a body including spaced-apart upper and lower support parts;

a movable compression member disposed between said upper and lower support parts, the control arm and the ball joint being receivable between said upper support part and said compression member during an installation, said compression member including means for contacting a base of the ball joint;

stop means carried on said upper support part for contacting the control arm adjacent said accommodating hole, said stop means including a tube-shaped portion having a longitidinal axis extending in a direction towards said compression member; and means for advancing said compression member in a direction towards said upper support part whereby compression force may be exerted upon the ball joint by said compression member, said tube-shaped portion of said stop means preventing motion of the control arm in the direction of a resultant ball joint advancement, whereby the ball joint is compressed into seated position.

24. The tool according to claim 23, wherein:

said tube-shaped member is cylindrical, and includes structure defining a longitudinally disposed opening.

25. The tool according to claim 24, wherein:

said longitudinally disposed opening extends continuously from a terminal end of said tube-shaped portion to said upper support; and said upper support includes a radially disposed stem slot formed therethrough in communicative alignment with said side opening.

26. The tool according to claim 23, wherein:

said compression member includes structure defining a central hole for receiving a grease fitting of said ball joint during compression thereof.

* * * * *